(12) United States Patent
Jones et al.

(10) Patent No.: US 6,798,406 B1
(45) Date of Patent: Sep. 28, 2004

(54) STEREO IMAGES WITH COMFORTABLE PERCEIVED DEPTH

(75) Inventors: Graham Roger Jones, Faringdon (GB); Nicolas Steven Holliman, Wallingford (GB); Delman Lee, The Peak (HK)

(73) Assignee: Sharp Kabushiki Kaisha, Osaka (JP)

( * ) Notice: Subject to any disclaimer, the term of this patent is extended or adjusted under 35 U.S.C. 154(b) by 431 days.

(21) Appl. No.: 09/663,461

(22) Filed: Sep. 15, 2000

(30) Foreign Application Priority Data

Sep. 15, 1999 (GB) ............................................. 9921638

(51) Int. Cl.⁷ .......................... G06T 15/00; H04N 13/00
(52) U.S. Cl. .......................... 345/419; 348/42; 348/51
(58) Field of Search ............................... 345/419, 420, 345/421; 348/42, 47, 51, 53

(56) References Cited

U.S. PATENT DOCUMENTS

| | | | |
|---|---|---|---|
| 4,647,965 A | | 3/1987 | Imsand .......................... 358/88 |
| 5,175,616 A | * | 12/1992 | Milgram et al. .............. 348/47 |

FOREIGN PATENT DOCUMENTS

| | | |
|---|---|---|
| EP | 0 641 132 A1 | 1/1995 |
| EP | 0 751 689 | 1/1997 |
| EP | 0 751 689 A2 | 2/1997 |
| JP | 60-236394 | 11/1985 |

OTHER PUBLICATIONS

Search Report, Application No. GB 9921638.4, dated Apr. 7, 2000.
Lipton: "StereoGraphics: Developers' Handbook" Online! Stereographics Corporation, 1997.
European Search Report regarding Application No. 00 30 7993 dated Apr. 13, 2003.

* cited by examiner

Primary Examiner—Phu K. Nguyen
(74) Attorney, Agent, or Firm—Renner, Otto, Boisselle & Sklar

(57) ABSTRACT

A method of producing a stereo image of a (real or simulated) scene using at least one (real or simulated) camera, which creates the impression of being a 3D image when viewed on a display by a user, wherein the depth of the scene is mapped onto a maximum perceived depth of the image on the display, and the maximum perceived depth is chosen to provide comfortable viewing for the user.

15 Claims, 5 Drawing Sheets

Viewing geometry of a stereoscopic display

Perceived depth on a stereoscopic 3D display systems

Parallel cameras and imaging adjustment requirements

Viewing geometry of a stereoscopic display

Mapping the display to the scene being captured

Flow diagram, calculating camera separation where focal length is fixed

Flow diagram, calculating camera separation where focal length is not fixed

Flow diagram, calculating focal length where camera separation is fixed

STEREO IMAGES WITH COMFORTABLE PERCEIVED DEPTH

BACKGROUND OF THE INVENTION

1. Field of the Invention

The invention relates to the production of stereo images.

The invention has applications in the fields of natural image generation by film or digital photography, analogue or digital video, movie film generation, and synthetic Image generation using methods including computer graphics or image based rendering systems, and is particularly relevant to two view stereoscopic devices including electronic and hard copy devices where more than one image of a scene is generated to create a 3D effect by showing a different image to a viewer's left and right eyes.

2. Description of the Related Art

Applications of the invention include photogragphy, videography, movie production, electronic shopping kiosks, computer games systems for home or public use, multimedia packages e.g. encyclopaedias, medical imaging, CAD/CAM systems, scientific visualisation, remote manipulation, remote sensing, security systems and any other application where a benefit is found from a stereoscopic 3D image of a scene.

Many types of stereoscopic and auto-stereoscopic electronic displays and printing or photographic reproduction methods have been developed, for example see the following European and British patent applications: EP 0 602 934, EP 0 656 555, EP 0 708 351, EP 0 726 483, GB 9619097.0 and GB 9702259.4. The problem of image generation for these systems is less well understood and many existing stereoscopic images can be uncomfortable to view even on a high quality stereoscopic imaging device. (Where the term stereoscopic is used it should also be taken to imply multi-view systems where more than one image is generated and presented to the user even if only two of the images are viewed at any one time by the left and right eyes.)

As described in B. E. Coutant and G. Westheimer, "Population distribution of stereoscopic ability", Opthal. Physiol. Opt., 1993, Vol 13, January, up to 96% of the population can perceive a stereoscopic effect and up to 87% should easily be able to experience the effect on desktop 3D display systems. The following summarises some problems inherent in previous approaches to stereoscopic image generation.

SUMMARY OF THE RELATED ART

Stereoscopic systems represent the third dimension, depth in front of and behind the image plane, by using image disparity As illustrated in FIG. 1. The image disparity displayed on a screen has a physical magnitude which will be termed screen disparity. Crossed disparity, $d_N$, results in a perceived depth, N, in front of the display plane while uncrossed disparity, $d_F$, results in a perceived depth, F, behind the display plane as illustrated in FIG. 1.

The screen disparities dn or df between homologous points in the left and right images are seen by the viewer as perceived depths N or F in front or behind the display plane. To see this effect the viewer must maintain focus on the display plane while verging their eyes off the display plane. This is thought to stress the visual image if the perceived depth value is too great and therefore limits are required for the values of N and F if comfortable images are to be produced.

These type of stereoscopic display systems do not exactly match the user's perception in the real world in that it requires the user to accommodate (focus) on the display surface while verging their eyes away from the display surface, see FIG. 1. Since the accommodation and vergence mechanisms are linked in the brain (see D. B. Diner and D. H. Fender, "Human engineering in stereoscopic viewing devices", 1993, Plenum Press, New York, ISBN 0-306-44667-7, and M. Mon-Williams, J. P. Wann, S. Rushton, "Design factors in virtual reality displays", Journal of SID, Mar. 4, 1995) this requires some effort from the viewer and a greater effort the more depth is being perceived. The invention recognises that the key variable to control is perceived depth, the larger this value is the more stress is placed on the viewer's visual system.

It is now widely recommended (see L. Hodges, D. McAllister, "Computing Stereoscopic Views", pp71–88, in Stereo Computer Graphics and Other True 3D Technologies, D. McAlister, Princeton University Press, 1993; A. R. Rao, A. Jaimes, "Digital stereoscopic imaging", SPIE Vol 3639, pp144–154, 1999; and R. Akka, "Converting existing applications to support high quality stereoscopy", SPIE Vol 3639, pp290–299, 1999) that images are captured using two cameras positioned so that the only difference between the two images is the image disparity due to a horizontal translation of cameras. This arrangement is normally referred to as a parallel camera system. This avoids viewer discomfort due to keystone distortion (this arises when the cameras are not parallel because the vertical dimensions of the two images vary from one side of each image to the other) and associated vertical disparity ie. when the two images are superimposed there is varying vertical disparity across the images. In addition, for physical cameras the optics and light sensitive media must be matched to avoid unnatural intensity or geometric distortions. The latter two issues are part of a specific camera design and are not considered further here.

As illustrated In FIG. 2, the parallel camera image must be processed to ensure the depth range captured in the image disparity fits both in front and behind the display plane. This requires the use of offset sensors or film behind the lens, skewed camera frustum (in the case of computer graphics) or image cropping. Without such adjustments all depth in the images will be perceived in front of the display plane.

FIG. 2 shows that the images from parallel cameras need to be adjusted, either to have the edge of the image cropped or by the use of an asymmetric camera fustrum. The latter is possible in many computer graphics systems, or can be achieved by offsetting the image sensitive material (e.g. CCD or film) to one side in a physical camera.

The factors which directly affect perceived depth are:

For depth behind the display surface, uncrossed disparity:

$$F = Z/((E/df) - 1)$$

For depth in front of the display surface, crossed disparity:

$$N = Z/((E/dn) + 1)$$

From these equations it can be seen that perceived depth depends on the screen disparity, the viewer's eye separation, E, and the display viewing distance, Z. While other methods have approximated or ignored these variables the new method allows them to be fully accounted for.

The screen disparity (dn or df) is important as it is determined by image disparity which in turn is determined by the image capture environment, including the camera parameters and the depth in the scene. The invention seeks to control image disparity and therefore screen disparity and perceived depth by controlling the camera parameters.

While various previous methods to control the camera parameters have been proposed none consider the issue of directly controlling perceived depth and often approximate the parameters such as the comfortable near and far perceived depth limits for the target display.

In. S. Kitrosser, "Photography in the service of Stereoscopy", Journal of imaging science and technology, 42(4), 295–300, 1998, a slide rule type calculator is described allowing selection of camera separation given the camera details and scene near and far distances. It does not take into account different viewer's eye spacings and the maximum image disparity is set at a predetermined value, It cannot account for the perceived depth the user sees when using a particular display and as has been discussed earlier this is the key variable in assessing the comfort of a stereoscopic image.

In L. Lipton, "Foundations of the Stereoscopic Cinema, A Study in Depth", Van Nostran Reinhold Company, 1982, Lipton examines the mathematics involved in positioning cameras and develops a set of tables for different film formats giving maximum and minimum object distances for a given convergence distance and lens focal length. He assumes converging cameras will be used and the maximum screen disparity Is the same for objects in front of the screen plane as well as objects behind the screen plane. Two sets of maximum object distances are calculated; the first is where a small divergence of the viewer's eyes is allowed (typically 1 degree) and the second where no divergence is allowed. These restrictions prevent this method from guaranteeing comfortable image generation at all times. The assumption of converging cameras ensures that some vertical disparity will be present in the image and therefore that many viewers will find the resulting images uncomfortable to view. In the internet site http://www.elsa.com/europe/press/releases/1999/graphics/revelato.htm, Elsa introduce a system called 'Dyna-Z' which dynamically adjusts the 'spatial effect'. No details are currently available about the method of operation of this system, although it is limited to real time computer graphics.

The question of what the near and far perceived depth limits should be is partially addressed by existing human factors work and it is possible to deduce typical working values for the SLE VPI displays of far limit +60 mm, near limit −50 mm from the following studies.

In A. Woods, T. Docherty, R. Koch, "Image Distortions in Stereoscopic Video Systems", SPIE Stereoscopic Displays and Applications IV, 1993, 36–48, Woods discusses sources of distortion in stereo camera arrangements as well as the human factors considerations required when creating stereo images. These experiments show that there is a limit in the screen disparity which it is comfortable to show on stereoscopic displays. A limit of 10 mm screen disparity on a 16" display at a viewing distance of 800 mm was found to be the maximum that all 10 subjects of the experiment could view.

In Y. Yeh, L. D. Silverstern, "Limits of Fusion and Depth Judgement in Stereoscopic Color Displays", Human Factors, 32(1), 1990, 45–60, Yeh shows the results of experiments carried out in order to determine binocular fusion limits. It is found that for comfortable viewing over short periods a maximum disparity of 27 minutes of arc is acceptable. With longer periods of viewing it is possible to adapt to view greater disparities but this does not indicate that large disparities are suitable for long term comfortable viewing of stereoscopic displays.

In S. Pastoor, "Human Factors in 3D Imaging", experiments by Pastoor indicate that disparities up to 35 minutes of arc do not cause any discomfort.

SUMMARY OF THE INVENTION

The invention provides a method of producing a stereo image of a (real or simulated) scene using at least one (real or simulated) camera, which creates the impression of being a 3D image when viewed on a display by a user, wherein in each position at which an image is captured the camera axis is parallel to the camera axis at all other positions, and the depth of the scene is mapped onto a maximum perceived depth of the image on the display, and the maximum perceived depth is chosen to provide comfortable viewing for the user.

The method may make use of parameters of the display, including the maximum perceived depth of an object in front of the display N, and the maximum perceived depth of an object behind the display F.

The method may make use of the user's eye separation E, and the distance Z of the viewer from the displays.

In an embodiment of the invention, the distance Z' from the camera to the Zero Disparity Plane is calculated based on the values of N and F, and also on the values of the distance N' from the camera to the closest surface in the scene, and the distance F' from the camera to the furthest surface in the scene.

In a further embodiment of the invention, the distance Z' from the camera to the Zero Disparity Plane is specified, and the values of N' and F' (as defined above) are also specified, and wherein the most suitable of N' or F' is kept fixed and a new value is calculated for the other of N' or F' based on the values of N and F.

Any one of N', F' and Z' may be calculated based on the values of the other two.

In a further embodiment of the invention, the maximum crossed and uncrossed disparities $d_N$ and $d_F$, are calculated from N, F, the separation E of the user's eyes, and the distance Z from the user to the display.

In a further embodiment of the invention, the camera separation A used to produce the stereo image is calculated based on N and F to achieve the desired perceived depth (N+F).

In a further embodiment of the invention, the field of view of the camera is adjusted to allow for that part of the image which will be cropped as a result of the use of parallel camera positions.

In a further embodiment of the invention, the camera separation is fixed, and the desired focal length of the camera is calculated to achieve the desired perceived depth (N+F).

In a further embodiment of the invention, the focal length f of the camera is taken into account when measuring the values of N' and F' (as defined above).

In a further embodiment of the invention, the camera separation A is limited to the user's eye separation E multiplied by the scale factor S as herein defined.

The invention also provides a computing device adapted to carry out a method as described above.

The invention also provides a camera or camera system comprising such a computing device.

In order to produce stereoscopic 3D images which are comfortable to view the positioning of cameras. (real or synthetic) requires great care. Stereoscopic displays are only capable of displaying a limited perceived depth range while there may be almost any depth range in a scene to be captured. The new method allows accurate positioning of parallel cameras for capturing stereoscopic images which exactly fit the depth in the scene into the perceived depth limits of the display. Information about the stereoscopic display for which the images are intended is used, along with information about the viewer of the display, the scene to be captured and the camera type to be used.

A chosen depth range in a scene being imaged is exactly mapped to a pre-defined perceived depth range on a stereoscopic 3D display. This ensures that a comfortable perceived depth range such as defined by human factors considerations is never exceeded when viewing the stereoscopic 3D images.

The near and far limits of the perceived depth range can be set independently allowing for precise control of the amount of depth effect seen by the user. This allows the images to be adapted to variations in viewer's perception of crossed and uncrossed screen disparities and enables precise artistic control of the 3D image composition.

In comparison to approximate methods or trial and error the new method of camera control ensures that a scene is always mapped onto the defined perceived depth range. This results in an easy to use method which does not require numerous image adjustments to ensure the depth viewed is within comfortable limits.

The new method can be implemented in software or hardware allowing it to control physical digital or photographic cameras or synthetic computer graphic cameras.

Depth measurements are taken to the known film plane (in the case of physical cameras) avoiding problems estimating the position of lens aperture positions. This is particularly important with zoom lenses where the apertures moves unseen to the user.

Camera parameters can be calculated instantly, which is useful for real-time computer graphics and control of video cameras in particular. Especially when compared with the use by previous methods of slide rules or printed tables of results.

Parallel cameras are supported which means simple mathematical equations can be used reducing computation requirements and the number of control variables.

BRIEF DESCRIPTION OF THE DRAWINGS

Embodiments of the Invention will now be described, by way of example only, with reference to the accompanying drawings, in which.

DESCRIPTION OF THE PREFERRED EMBODIMENTS

There is only a limited depth range that may be shown on stereoscopic displays, while the depth visible in any particular scene could cover almost any range. Therefore, there is a need for a method of controlling the way physical scene depth maps to perceived display depth when, for example, taking a stereoscopic photograph or creating (ie. computer simulating) a stereoscopic computer graphic image.

A first embodiment will be described in which the camera separation, A, is calculated from other input data, for stereoscopic photographs taken with a physical camera or cameras.

We consider the situation where a photographer has composed the desired view, including the camera position and focal length (zoom), and wishes to know how far apart to take the left and right image to capture the correct disparity range for the target display. This naturally fits into a typical photography session where the photographer composes a shot by setting zoom and position before taking the shot.

Initially, details of the display and viewer are required. These parameters (see FIG. 3) include:

Display Parameters

N maximum perceived depth of any object in front of the display plane
F maximum perceived depth of any object behind of the display plane
W Physical width of the viewing area of the display, or partial area in which the image will be displayed.
Z Viewing distance of the display.

Viewer Parameters

E Eye spacing of the viewer.

Typically these are fixed for each display type. The camera specification may be tailored to a specific viewer with an appropriate setting of E—or for an average viewer this can be set to approximately 60 mm.

This allows calculation of the maximum crossed and uncrossed screen disparities allowable, from N and F:

$d_N = NE/(Z-N)$ Crossed disparity $d_F = FE/(Z+F)$ Uncrossed disparity

Figure 1:
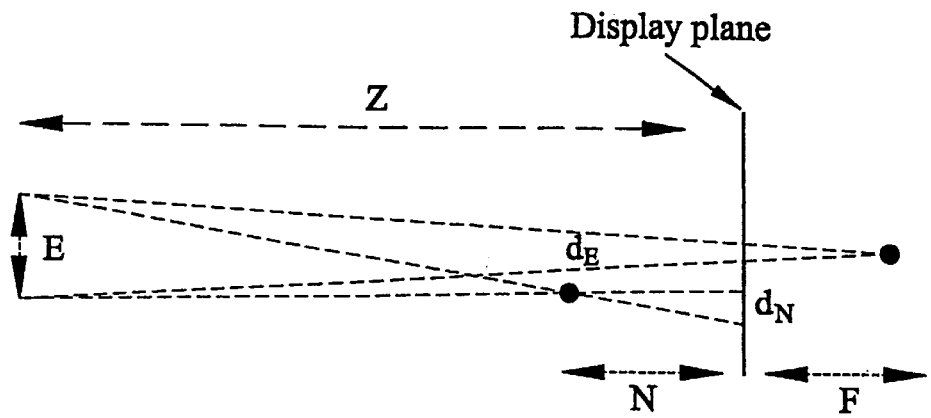
FIG. 1 shows the variables involved in depth perception in a stereo image.
Figure 2:
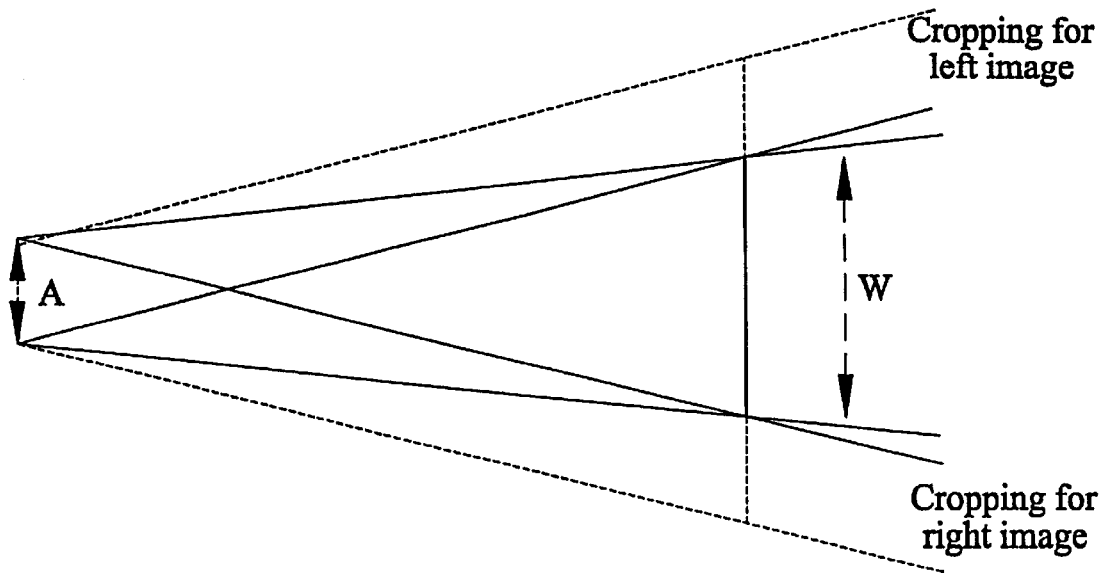
FIG. 2 shows the adjustments which are necessary when using parallel cameras, which are for example image cropping or offsetting the image sensitive material (e.g. CCD or film) to one side in a physical camera.
Figure 3:
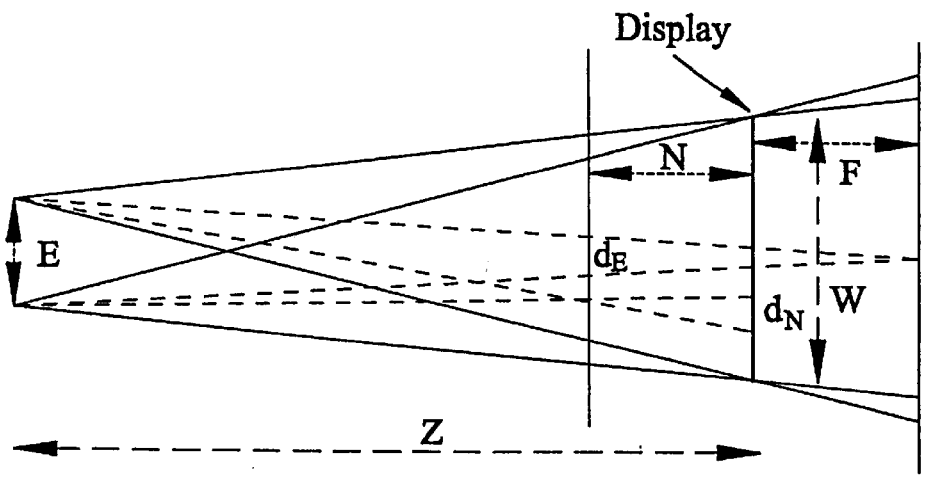
FIG. 3 shows the viewing geometry of a stereoscopic display.

These equations follow from the geometry shown in FIG. 3. The ratio $d_N/d_F$ will be used at a later stage.

Figure 4:
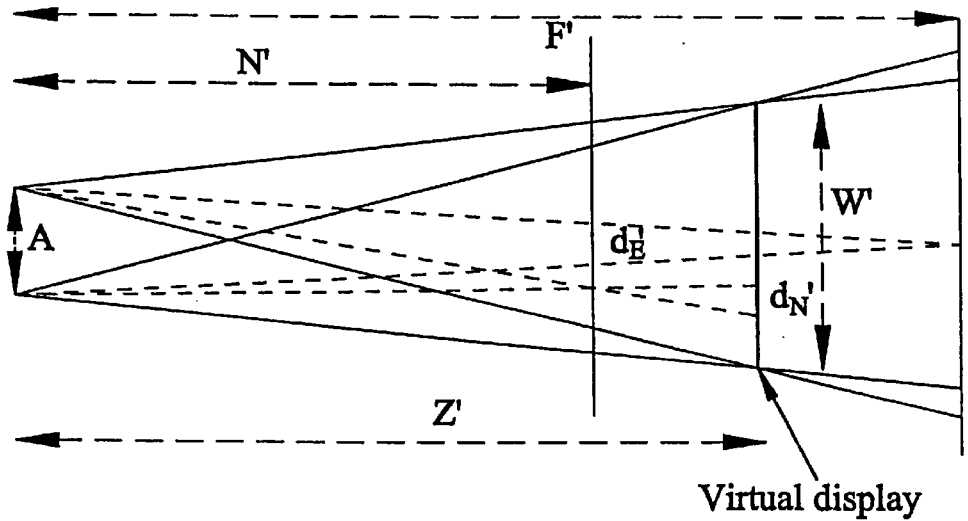
FIG. 4 shows the geometry involved in the capturing of the images of a scene.

Following this the known parameters of the camera and scene (see FIG. 4) must be entered. These are:

Scene Parameters

N' Distance from the camera to the closest visible surface in the scene
F' Distance from the camera to the furthest visible surface in the scene Camera Parameters $W_f$ Width of the imaging area of the camera.
f Focal length of the camera/lens required to capture a chosen view.

From this information Z', the distance to the Zero Disparity Plane (ZDP) (also known as a "virtual display", having width W', see FIG. 6) may be calculated. This is the distance from the camera to objects which will appear to be in the plane of the display once the photograph has been taken. Anything closer to the camera than Z' will appear to be between the display and the viewer. Anything further than Z' from the camera will appear behind the display.

Since the depth in the scene is to be mapped to the depth allowable on the display the ratio $d_N'/d_F'$ is equal to $d_N/d_F$ (which we will call R). $d_N'$ and $d_F'$ are given by the following equations:

$$d_N' = \frac{A(Z' - N')}{N'} \quad [3]$$

$$d_f' = \frac{A(F' - Z')}{F'} \quad [4]$$

where A is unknown, so:

$$\frac{d_N}{d_F} = \frac{d_N'}{d_f'} = R = \frac{(Z' - N')F'}{(F' - Z')N'} \quad [5]$$

Which gives, when re-arranged:

$$Z' = \frac{(R+1)}{\frac{1}{N'} + \frac{R}{F'}} \quad [6]$$

in the case where $d_N = d_F$ this simplifies to $Z'=2/(1/N'+1/F')$

With a physical camera it may be difficult to alter the focal length precisely, so the camera separation will be calculated assuming f may not be changed. The resulting images will be cropped, giving a stereoscopic image covering a slightly smaller field of view than the actual setting input by the photographer. The amount to be cropped is equal to the camera spacing A when the display is mapped to the world.

To map the display to the world a scale factor, S, is calculated. The distance to the zero disparity plane Z' is known and θ, the field of view, easily calculated, giving the width of the area of the scene captured at a distance Z' from the camera. The width of the captured scene at the calculated depth Z' is equal to the effective width W' of the virtual display (see FIG. 6) plus the camera separation.

$$\theta = 2 \tan^{-1}(W_f/2f)$$

$$(W'+A) = 2Z' \tan(\theta/2) = Z'W_f/f \quad [7]$$

The scale factor, S, between the display when mapped to world space and the physical display itself may now be calculated:

$$S = (W'+A)/W+A/S) = Z'W_f/f(W+A/S) \quad [8]$$

Also from equation [3]:

$$d_N' = Sd_N = \frac{A(Z' - N')}{N'} \quad [9]$$

so $$\frac{A}{S} = \frac{d_N N'}{Z' - N'} \quad [10]$$

and $$A = \frac{Sd_N N'}{Z' - N'} \quad [11]$$

Substituting A/S into equation [8] gives:

$$S = Z'W_f/f(W+d_N N'/(Z'-N'))$$

And so the desired camera spacing A is given by:

$$A = \frac{Z'W_f d_N N'}{f\left(W + \frac{d_N N'}{(Z' - N')}\right)(Z' - N')}$$

$$= \frac{Z'W_f d_N N'}{f(W(Z' - N') + d_N N')}$$

$$= \frac{W_f}{f\left(\frac{W}{d_N}\left(\frac{1}{N'} - \frac{1}{Z'}\right) + \frac{1}{Z'}\right)}$$

The value of A calculated from $d_N'$ or $d_F'$ can be shown to be identical.

The correct stereoscopic image is given when a proportion of the left and right images is cropped. The same proportion is removed from the left edge of the left image and the right edge of the right image. The proportion to crop is given by:

crop proportion=$A/(W'+A)$ [13]

Figure 5:
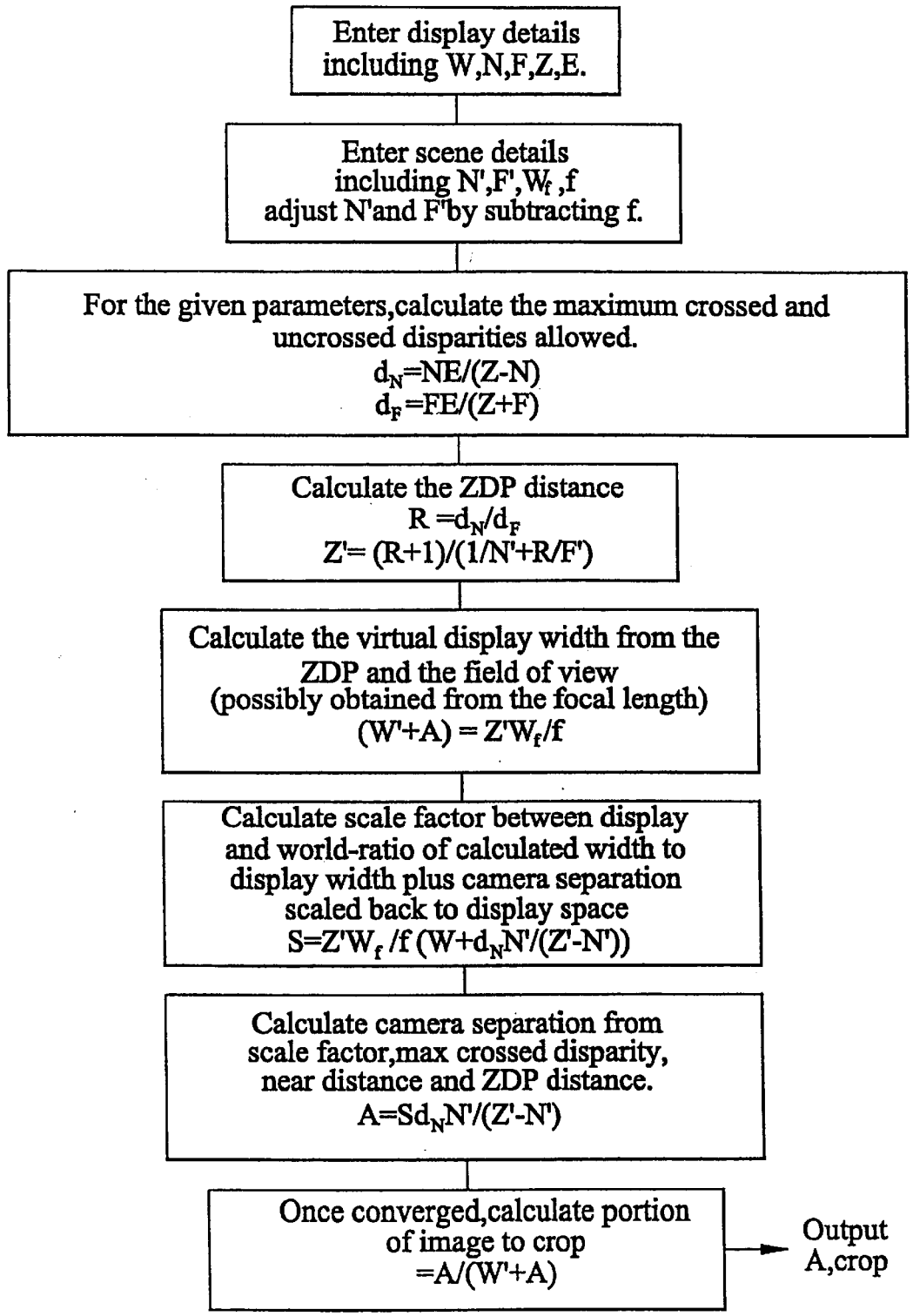
FIG. 5 is a flow diagram showing the calculation of camera separation where field of view/focal length is fixed.

The steps in this method are summarized in the flow diagram of FIG. 5.

All the input values are independent and may be measured in any order at any time prior to computing the stereoscopic camera parameters. As noted later careful calibration of a real camera may be required in order to ensure accurate results.

This method has been successfully used as part of an apparatus for taking stereoscopic photographs using a single digital still camera, for example a Kodak DCS 3, on a slide rail. The camera is calibrated so that its optical axis is at right angles to the slide rail. The view is composed and the focal length read from the camera electronically or physically. The inter-axial separation required to take a comfortable image for the target display is calculated using, for example, a camera calculator and the left and right images are captured using this value by sliding the camera along the rail the required distance. This apparatus has been successfully used to capture comfortable Images for various target displays.

The calculations specified above assume the distance N' and F' are measured from the pin-hole point of the camera. With a real camera it is easier to measure to the film plane so f should be subtracted from N' and F' before performing the calculations.

A variation of the first embodiment is possible in which the camera separation is calculated from other input data, for stereoscopic images created in Computer Graphics software.

In this situation all measured distances will be to the appropriate point, so adjusting by f, described in the previous section, is unnecessary. In fact field of view is more likely to be defined than focal length so θ may be entered directly into equation [7] above.

Further variations of the first embodiment are possible, in which Z' is already chosen, as will now be described.

1. If the zero disparity plane Z' and the minimum distance N' are specified, then the resulting F' can be calculated as $$F' = \frac{R}{\frac{1}{N'} - \frac{R+1}{Z'}} \quad [14]$$

A warning is automatically given to the user by the device performing the calculation that this F' is the maximum distance allowable for a visible surface from the camera.

2. If the zero disparity plane Z' and the maximum distance F' are specified, the resulting N' can be calculated as:

$$N' = \frac{1}{\frac{R+1}{Z'} - \frac{R}{F'}} \quad [15]$$

A warning is automatically given to the user by the device performing the calculation that this N' is the minimum distance allowable for visible surfaces to be from the camera.

3. If the zero disparity plane Z', the minimum distance N' and the maximum distance F' are specified further action must be taken since it is not possible to map any arbitrary combination of N', Z' and F' to the allowed perceived depth range (ie. N+F) of the display.

Assuming the input value for Z' is not to be changed the system must choose the most suitable of either N' or F' to keep fixed and then compute an adjusted version of the other.

The system computes alternative values for N' and F' (here called N* and F*) from equations [14] and [15] and compares them with the originals. Either N', Z' and F* will span a range greater than N', Z' and F', or N*, Z' and F' will span a greater range.

If F*>F' then Z' and N' are used in the camera parameter calculations and F* replaces F' If N*<N' then Z' and F' are used in the camera parameter calculations and N* replaces N'.

This then ensures that the scene depth range maps onto the comfortable perceived depth range for the display.

A second embodiment will now be described in which camera separation is calculated from other input data, for stereoscopic photographs taken with a real camera (when θ, or f, may be altered).

In a situation where the field of view of the camera may be altered after setting up the view, with a purpose built sltereoscopic camera, with an accurately controlled camera, or with Computer Graphics cameras, a view closer to the original choice of the photographer may be obtained.

In this case equations [1] and [6] are followed as before. In this case the field of view will be expanded to encompass the extra image width which will later be cropped.

$$W' = 2Z' \tan(\theta/2) = Z'W_f/f \quad [16]$$

W (the real display width) is known, as is W'—this giving the scaling between the display and the worlds:

$$S = W'/W \quad [17]$$

The maximum disparities, $d_N$ and $d_F$ are then scaled up to match the size of the virtual display, giving the values for $d_N'$ and $d_F'$. From these A, the camera separation, may be calculated:

$$d_N' = Sd_N = \frac{A(Z' - N')}{N'} \quad [18]$$

$$A = \frac{Sd_N N'}{Z' - N'} \quad [19]$$

The final stage is to calculate the new field of view for image capture. An area the width of the virtual display plus the camera separation must be captured in order to obtain stereoscopic images with the disparities calculated from cameras with parallel axes. The new field of view, θ' is:

$$\theta' = 2 \tan^{-1}((W'+A)/(2*Z')) \quad [20]$$

from this a new value for the focal length is found:

$$f' = W_f/Z \tan(\theta'/2) \quad [21]$$

All the required camera parameters are now available, specifically θ and A.

Once again, the distances N' and F' are assumed to be measured from the pin-hole point of the camera. If they are measured from the film plane then f must be subtracted before carrying out the calculation of A and θ. Subsequently a recursive calculation is required since the focal length is changed by this calculation. In the recursive calculation a new N' and F' are calculated, by subtracting f' from the input values of N' and F'. These new values are entered into equation [6] and all subsequent stages, from equation [16] are repeated until convergence. It may be possible to solve the recursive equation to give a single calculation producing the correct result without recursion.

Figure 6:
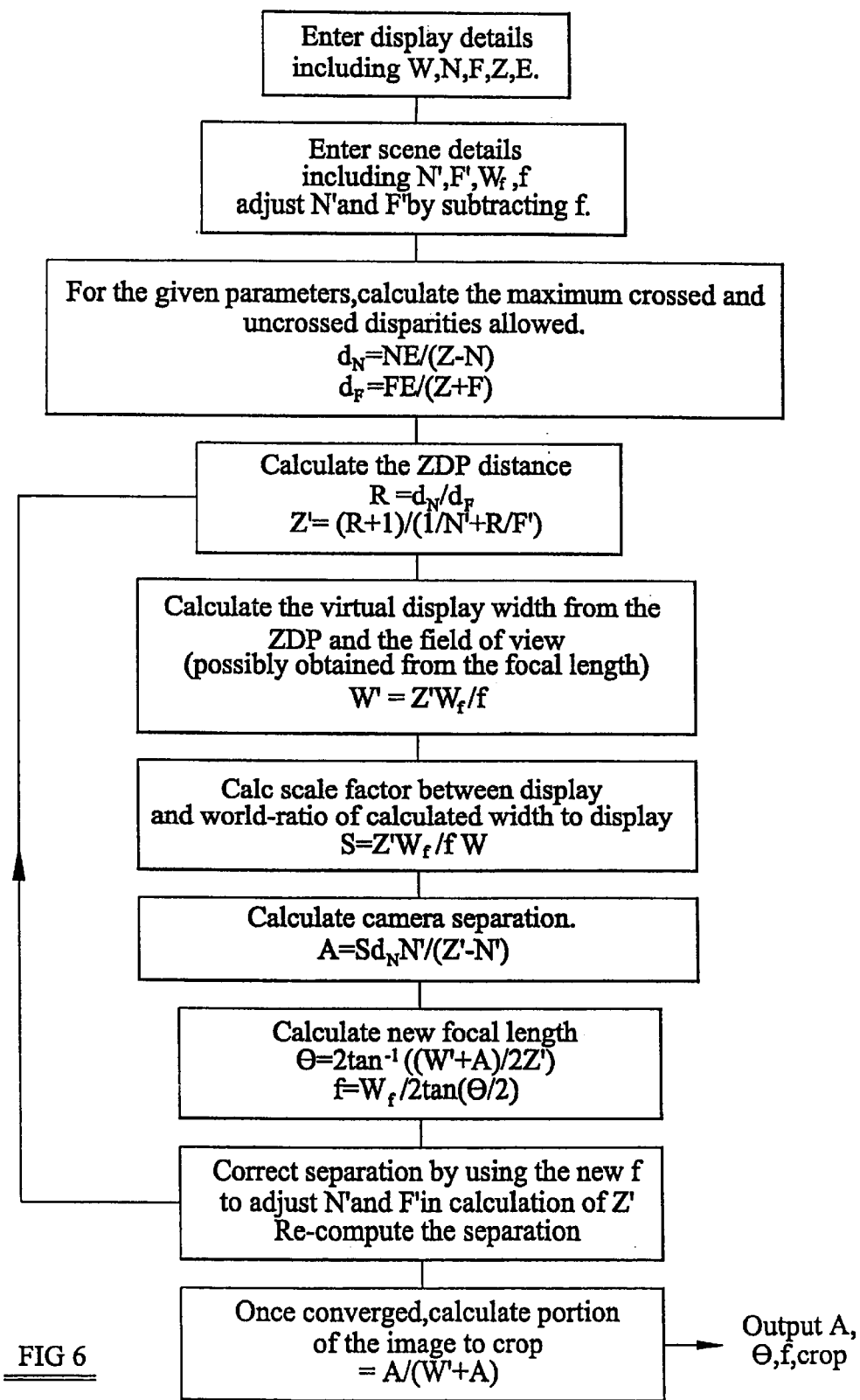
FIG. 6 is a flow diagram showing the calculation of camera separation where field of view/focal length is not fixed.

The steps in this method are summarised in the flow diagram of FIG. 6.

A variation of the second embodiment is possible in which the camera separation is calculated from other input data, for stereoscopic images created in Computer Graphics software (when θ (or f) may be altered).

With computer graphics cameras everything is usually centred around the pinhole point. so corrections for changes in the focal length are usually unnecessary and the recursive calculation is unnecessary.

θ will normally be supplied, instead of F, so $W_f$ is unnecessary and only a new value of θ needs to be calculated, the subsequent calculation of f is no longer required.

The computer graphics methods have been implemented in the SmartStereo software package and used to produce still images, movie sequences and real time computer graphics. These have resulted in easy to use stereoscopic image generation which repeatably produces comfortable to view stereoscopic images. For example generating camera control scripts for the 3D Studio Max software package from Kinetix to produce both still images and movie sequences to be replayed in QuickTime movie format.

Variations of the first and second embodiments are possible in which camera separation is limited in order to avoid expanding depth when only a narrow depth range is present in the scene.

If a very small depth range is to be captured in a scene, less than the range of allowable perceived depth on the display, the objects will appear to be stretched when the camera separation is adjusted to ensure the scene depth maps to the display depth.

This can be avoided by clamping the camera separation (A) to a maximum value of the eye separation (E) multiplied by the scale factor (S).

Or setting the scene depth range to capture a volume around the object rather than the object itself, it may be desirable to make this volume orthoscopic.

In the case of both computer graphics synthetic cameras and physical cameras the perceived depth may match exactly the scene depth. In this orthoscopic case there will be minimal depth distortions in the perceived depth compared to the case where very large or very small scene depth is mapped to the comfortable perceived depth range.

A third embodiment will be described in which the field-of-view of focal length (zoom) is computed from other input.

In cases where the camera separation is fixed, the zoom can be adjusted to achieve the desired comfortable perceived depth on the display.

There are advantages to a design of stereoscopic camera in which zoom is controlled by altering the camera separation, perhaps when there are two, or more, lenses on the camera to capture the stereoscopic images simultaneously. Other examples are where there is a fixed separation (e.g. for AGFA camera+Pentax image splitter) but the zoom can be adjusted over a range to help match differing scene depth ranges. This also occurs with certain video camera adapters where the zoom may be easier to control than the separation. It also can have a benefit where the zoom is controlled accurately but the separation is not controlled accurately. The separation is set and measured and the zoom adjusted to precisely match the scene depth range to the comfortable perceived depth range on the target display.

When there is a specified depth to be captured and mapped to a stereoscopic display, and the camera separation (A) is specified, the field of view captured (or the focal length of the lens) must be specified to ensure the depth range displayed on the stereoscopic display within the chosen limits.

To calculate appropriate stereoscopic camera parameters in this situation the following method is used:

As described in the embodiment above, where camera separation is calculated, compute the value of Z' (equations [1] to [6]), the distance to the ZDP, if it is not supplied.

In this case A, the camera separation, is known so a value for $d_N{'}$ or $d_F{'}$ is computed (equations [3] and [4]). The scale factor S is given by:

$$S = d_N{'}/d_N \quad [22]$$

Scale the display size, W, to the world, W'=SW, and calculate the field-of-view from:

$$\theta' = 2 \tan^{-1}((W'+A)/2Z') \quad [23]$$

In this situation measurements for N' and F' are assumed to be to the pin-hole point of the camera. These distances are difficult to measure, so a more realistic measurement is to the film plane of the camera. In order to take into account the focal length of the lens a recursive calculation would be carried out whereby the focal length is subtracted from the measured distances (giving new values for N' and F') which are inserted into equation [6]. A value for θ' is then calculated (and converted to focal length (zoom)), from equations [22] onwards. This new focal length is used to correct the measurements recursively until the result converges. A suitable initial value for the focal length would be the focal length needed to give the field of the display as seen by the viewer. It may be possible to solve the recursive equation to give a single calculation producing the correct result without recursion.

Figure 7:
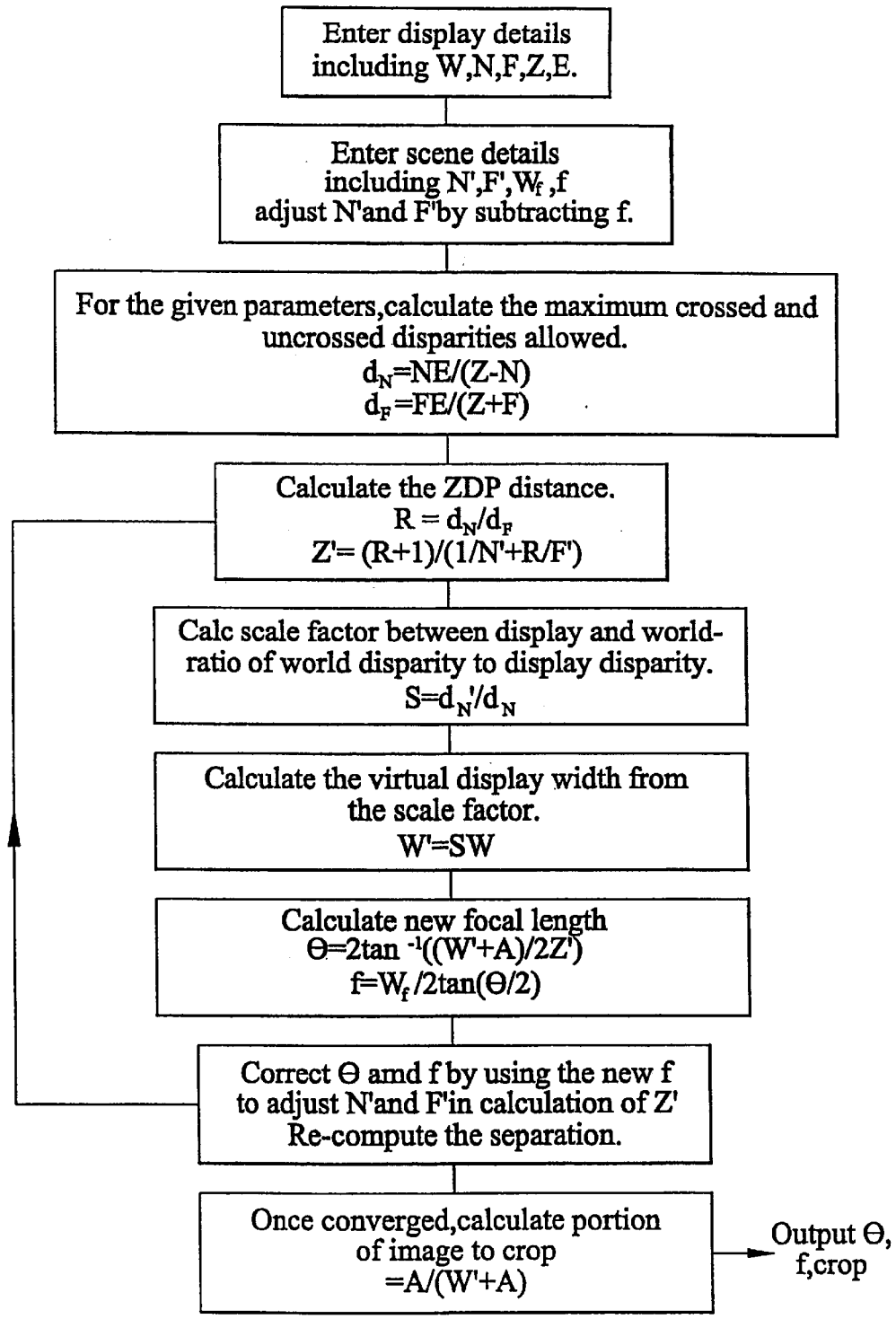
FIG. 7 is a flow diagram showing the calculation of field of view/focal length where the camera separation is fixed.

The steps in this method are summarised in the flow diagram of FIG. 7.

In a very simple system using Computer Graphics cameras it may be enough just to specify the separation and trust the user to offset the cameras from the original composed view in the appropriate way.

An improved, easier to use, solution is for the user to provide the position and direction information for CG cameras. The system calculating the camera parameters can then compute the correct position, orientation and field-of-view for the left and right cameras. This is then entered by the user into the CG software, written to a script to be read directly by the CG software or returned by a programming API directly to the graphics software.

Some Computer Graphics systems (API/software/script languages etc) allow specification of a 'viewing frustum'. This specifies the offset from the viewer to the edges of the image (in world space), which allows incorporation of the cropping, described above, directly into the image generation. When the viewer is positioned centrally in front of the display the offset to the left hand edge of the image for the left eye, in world space is:

$$\text{frust}_L = -(W'/2 - A/2) \quad [24]$$

the offset to the right hand edge or the image for the left eye is:

$$\text{frust}_R = (W'/2 + A/2) \quad [25]$$

the offsets to the top and bottom are (H' is the display height scaled to the world):

$$\text{frust}_T = H'/2 \quad [26]$$

$$\text{frust}_B = H'/2 \quad [27]$$

The equivalent values for the right eye are:

$$\text{frust}_L = (W'/2 + A/2) \text{ and } \text{frust}_R = (W'/2 - A/2) \quad [28]$$

$\text{frust}_T$ and $\text{frust}_B$ are the same as equations [26] and [27].

These values are normally specified in terms of the near clipping plane, $c_N$ (for example in OpenGL). To convert this representation the values above are multiplied by $c_N/Z'$.

This type of control has been implemented in SmartStereo OpenGL API which is used within a VRML model viewer to ensure the scene remains comfortable to view at all times.

Camera parameters when the viewer is not positioned centrally in front of the display will now be discussed.

If no method of tracking the position of the viewer is used an assumption must be made about their position relative to the display. However, if the viewer's position is known it may be used to alter the camera parameters to give a less distorted stereoscopic image when not positioned centrally in front of the display.

If the viewer's location relative to the centre of the display is specified as follows: (X, Y, Z), where X and Y are parallel to the display plane and Z is perpendicularly away from the display. |Z| is used in the camera parameter calculations.

The X and Y position of the viewer relative to the display must be transferred to the world co-ordinate system, either by scaling by S from the camera parameter calculation or by scaling by A/E also from the camera parameter calculation (x=XS or x=XA/E, and y=YS or y=YA/E).

In the case of Computer Graphics cameras, specified with a frustum (equations [24] to [28]) to the left eye frustum is calculated as follows:

$$\text{frust}_L = -(W'/2 - A/2 + x)$$

$$\text{frust}_R = (W'/2 + A/2 - x)$$

$$\text{frust}_T = (H'/2 - y)$$

$$\text{frust}_B = -(H'/2 + y) \quad [29]$$

and the right eye frustum is calculated as follows:

$$\text{frust}_L = -(W'/2 + A/2 + x)$$

$$\text{frust}_R = (W'/2 - A/2 - x)$$

$$\text{frust}_T = (H'/2 - y)$$

$$\text{frust}_B = -(H'/2 + y) \quad [30]$$

If the frustum is specified in terms of the near clipping plane these values are scaled by $c_N/Z'$.

This additional calculation is useful for display systems which track the user's head position and are driven by computer graphics systems that can update the view as the viewer moves their head.

Calculations when the input values are maximum and minimum disparities between two existing photographs will now be discussed.

This is the case where a stereoscopic pair (of images) has been analysed by hardware or software methods to find the disparities between homologous points in the images. In this situation some method is required for indicating the change in camera separation and the change in the image cropping necessary to bring the disparities into the range defined for the display in use.

The details of the intended display device are known, as before, so the disparity range permissible on the display may be calculated ($d_F - d_N$). These are also converted into a proportion of the display width by dividing by the width.

The maximum and minimum disparities present in the images, $d_F'$ and $d_N'$, are obtained and used to give the range present in the stereoscopic images. The disparity range here is ($d_F' - d_N'$). These values may be provided in many forms, the most likely being pixel disparities, or as a proportion of the image width. When pixel disparities are provided the image width in pixels must also be supplied for the following calculations.

$d_N$, $d_F$, $d_N'$ and $d_F'$ are assumed to be converted to proportions of the display and image widths from here. Also the images from which the disparities were taken are assumed to have been taken with parallel cameras and to have not been cropped.

The disparity of points in the input image which should lie on the screen plane, and therefore have zero disparity, is either predetermined from measurements from the images or calculated in the following manner:

$$d_{Z'} = (d_N' + (d_N/d_F)*d_F') \quad [31]$$

Alternatively, if $d_{Z'}$ specified, one of either $d_N'$ or $d_F'$, the missing parameter may be calculated from one of the following equations:

$$d_N' = (d_N/d_F)(d_{Z'} - d_F') + d_{Z'} \quad [32]$$

$$d_F' = d_{Z'} - (d_F/d_N)(d_N' - d_{Z'}) \quad [33]$$

If all three parameters are specified $d_{Z'}$ is retained and $d_N'$ or $d_F'$ recalculated for the viewing parameters in order to cover at least the same depth range, in a similar manner au described earlier (where Z' is already chosen). Changes in disparity are linear with changes in camera separation so the current camera separation must be scaled to match the disparity range in the captured images to the disparity range permitted on the display. After this the image cropping must be altered to adjust the ZDP so that the objects appear at the correct depths. A proportion of the image must be cropped from the left side of the left image and the right side of the right image.

Cropping any amount from the input images will alter the proportion of the image represented by the disparity. In fact the actual disparity scales by:

(1/(1−crop proportion)).

After solving the equations governing this relationship the scale factor is:

$$S = -d_N'/(d_f'(d_N+1) - d_N') \quad [34]$$

The proportion of the images to crop is calculated as:

$$\text{Cropping} = -Sd_{Z'} \quad [35]$$

If A is known, either input by the user or calculated in using the methods described earlier, the scaled value (S*A) may be output for the user.

If the images used to obtain the disparities have already been cropped the simplest solution is to calculate the disparity proportions as a proportion of the uncropped image. Otherwise the camera separation, as a proportion of the image width, must be known. This assumes knowledge of Z', W' etc. If these are known the uncropped width is known and the method already described is used. The cropping specified by equation [32] is to be taken off the uncropped images and may be more or less than the cropping applied to the images initially.

An alternative way of matching image disparity to display disparity, if the camera separation (A) cannot be changed (perhaps in a fixed head camera), is to alter the focal length of the camera (or field-of-view).

The disparity of a point at a distance N' is:

$$d_N = Af/N' \quad [36]$$

so with A and N' fixed, scaling $d_N$ by a factor S requires scaling the focal length, f, by the same factor.

The scale factor required to alter $d_N$ is calculated using equation [34], and equation [35] again gives the cropping required to adjust the disparity to fit the correct range on the display.

Physical limits of the camera will now be discussed.

With real cameras there will be a limit on the range of focal lengths the lens may be set to and also on the camera separation. A real system using these protocols would have to recognise when the required settings are outside the limits of the hardware and indicate this to the user.

Use of the method with moving cameras, a changing scene or video image will now be discussed.

If the scene is changing there are two choices.

1. Decide on the maximum depths which are likely to be seen and determine one set of camera parameters used throughout.
2. Determine the depth visible in the scene before taking each new stereoscopic picture.

Option 1) is limited in that it requires some decision about the range of depths which will be present in the scene. If the scene changes are unpredictable the depths may exceed this and the stereoscopic image will potentially be uncomfortable to view.

For option 2) some method of determining the depth in a scene is required. For a computer graphics system using a depth buffer, as is common with most 3D graphics rendering methods, would allow reading of all the depth displayed in a frame. The depth buffer for one frame could be used to determine the depth likely to be present in the next frame. This is quite effective when the scene changes are gradual.

Another alternative, with a computer graphics system, is to render the current frame once, before rendering the stereoscopic version. This pre-rendering could be used to provide the depth information. Most graphic effects, such as texturing and lighting, which slow down rendering, could be turned off since the image is not intended for viewing. Also the image could be drawn smaller than the required image to further reduce the rendering time.

With any depth measuring system there are likely to be jumps in camera separation or zoom as objects enter and leave the measurement space. Using an expanded field of view with the pre-rendering method would allow prediction of changes in depth likely to happen in later frames, allowing the changes in zoom or camera separation to be smoothed over time, reducing the stress caused to the viewer.

Where the stereoscopic images are being captured by real cameras (possibly video cameras) some form of range finder might be used to measure the distances as each frame is shot, e.g. camera auto-focus system or laser range finder. Alternatively, the images may be processed using computer vision methods to measure the depths present from frame to frame, in order to estimate the parameters for the next frame. Again, using a range finder of some form will allow prediction of future depth changes.

Processing stereoscopic images to determine the depth range presented in them gives the possibility of altering the images to present new views of the same scene, without taking more photographs.

Use of focus information in a real camera will now be discussed.

The Kodak DCS 3 digital camera has a 'Depth of field' focusing method whereby the photographer focuses on the near object, the far object and then frames the scene and takes the photograph. The camera ensures that the shutter speed and aperture are set so that the depth of field in the image matches the near and far focus distances selected by the photographer. This relates only to measuring a depth range using a camera, not to setting depths for a stereoscopic display.

Information from any similar auto-focus system in a real camera may be used to capture some of the details required for the calculations. This can be helpful when the distances to near and far points in a scene may be difficult to measure directly, especially if the distances are large.

One way of using this information would be to focus three times:
1. Focus an the nearest point and store that information (possibly by a half press of the shutter release).
2. Focus on the furthest point and store that (another half click)
3. Set up the desired shot, trying to avoid moving the camera too far. Adjusting FOV/f to the required value and make sure the camera is correctly oriented.

The distances measured by the autofocus system would then be used as the input to the camera protocols as the distances to the nearest and furthest points. The lens focal length would be taken automatically from the lens, or adjusted automatically in the case of a camera where lens separation is set by the user and f adjusted to match. The only remaining details to be entered then are the display parameters. Either a set of defaults could be built in, perhaps with selection from a menu, or if the camera is programmable, new display settings could be downloaded to it.

It may be possible to measure the photographer's eye separation by asking him/her to move the camera lenses, of a multi-head camera, so they (or markers on them) are in front of their eyes, and taking a measurement of the separation.

There are many methods that could be used to measure the real depth in a scene, these include: Range finders of any type, auto focus mechanism on a real camera, tape measure, disparity estimation from stereoscopic image pairs, laser/ultrasonic rangefinder.

With CG software, the depths could be found by ray-tracing, use of the depth buffer, computing distances directly to the objects, or to their bounding boxes. Many solutions are available to find nearest and furthest the surface in the computer graphics literature.

Physical camera calibration will now be discussed.

Care must be taken when converting entered or calculated focal length values to field-of-view values, that accurate parameters are used for the conversion.

Any real camera used for taking stereoscopic photographs using the methods described should be calibrated accurately for the true focal length. If the true focal length is not the same as the reading from the lens, incorrect separation or focal lengths may be calculated, producing errors in the resulting images.

With digital cameras a width for the CCD is specified though in reality the full width may not be used. This must be taken into account when entering details into the camera separation methods.

One method for calibrating a camera is to photograph a ruler (crossing the entire field of view horizontally) at a known distance from the camera. The width of the photographed portion (L) combined with the distance of the ruler from the camera (C) allow calculation of the field of view. The effective film/CCD width at any given focal length (read from the lens/imaging software) is also easily calculated:

$$\theta = 2\tan^{-1}(L/2C)$$
$$W_f = Lf/C$$

Note also that the calibration will change as the focal length of the camera lens is changed, so $\theta$ and $\underline{W}_f$ should be calculated at several different zoom settings.

Adjusting the images when viewed if the display used for viewing is different from the display assumed during calculation of the camera parameters, will now be disclosed.

If the display used for viewing is different, or even the eye separation of the viewer is known to be different, the images may be adjusted after capture to adjust the perceived depth on the new display. This is likely to reduce the image quality, since the images may be scaled/cropped, so it would usually be best to capture the correct image in the first place.

To accomplish the adjustment the method described to adjust the camera separation based on disparities in a stereoscopic pair is used. The disparities in the images to be viewed must be provided, either by having stored them with the image pair, or analysing the images to find the disparities.

Equation [34] is then used to obtain a scale factor for the images. This scale factor is used to reduce (or increase) the size of the image on screen, relative to the full screen size. Equation [35] can then be used to provide an offset for the images to ensure the perceived depth fits the required range for the new display.

Multi-view image capture systems will now be discussed.

For multi-view image capture systems the focal length of all cameras must be identical, otherwise some image pairs will have vertical disparity, potentially causing discomfort to the viewer.

Also, images in a multi-view system may be viewed by the left eye in one situation and by the right eye when the viewer has moved across the display. This means the images cannot be cropped to give any desired perceived depth distribution—all the depth must appear in front of the display plane. It is possible to adjust the amount displayed by altering the camera separation according to the depth visible in each image pair. Any variations in camera separation due to scene depth changes must be gradual, (as for the case of dynamic camera control).

If the display is tracked it would be possible to arrange for the images to be cropped in real-time in order to adjust the perceived depth range.

avoiding 'frame-cancelling' will now be discussed.

Frame-cancelling occurs when objects which should appear in front of the display plane are at the edge of the images. The brain interprets the depth of an object which goes off the edge of the images as being behind the screen border, and so behind the screen plane in depth because it should be visible if it was in front. This can produce an uncomfortable image even if the perceived depth range is within the defined limits for the display.

This conflict can be avoided by detecting such areas and adjusting the scene input parameters to put objects at the screen edge behind the display plane. The image should be analysed in order to determine the distance to the closest object at the image edge and to set Z' to this distance. Alternatively any other measurement method could be used either within, or external to, the camera.

If disparity at the screen edge is measured, or the images are to be adjusted after they have been taken, the method described earlier for adjusting camera parameters when disparity is defined would be used. $d_N'$ is the smallest disparity of objects at the edge of the images and $d_F'$ is also measured from the image. $d_N$ would be set to 0 and $d_F$ calculated, as before, from the display.

Using approximations when accurate measurement is difficult will now be discussed.

In situations where it is difficult to make accurate measurements approximations may be used to give useful results.

- A 'typical' viewer is usually taken to have an eye separation of 60 mm
- Unless tracked the actual distance of the viewer from the display (Z) is unknown, the design viewing distance would be used.
- Precalculated sets of camera parameters for broadly applicable situations may be used—e.g. compute cameras for
  - 'distant objects' (perhaps scene depth from 1000 m to infinity)
  - 'far objects' (perhaps scene depth from 100 m to infinity)
  - 'mid range' (perhaps scene depth from 10 m to 100 m)
  - 'close range' (perhaps scene depth from 0.5 m to 10 m)

The depth mapping will not be the exact mapping expected if measurements are accurate but it is simple to estimate the appropriate depth range to ensure all depth actually present in the scene is within the limits of the broader categories listed.

What is claimed is:

1. A method of producing a stereo image of a (real or simulated) scene using at least one (real or simulated) camera, which creates the impression of being a 3D image when viewed on a display by a user, wherein in each position at which an image is captured the camera axis is parallel to the camera axis at all other positions, and the depth of the scene is mapped onto a maximum perceived depth of the image on the display, and the maximum perceived depth is chosen to provide comfortable viewing for the user, wherein the method makes use of parameters of the display, including the maximum perceived depth of an object in front of the display N, and the maximum perceived depth of an object behind the display F, and also makes use of the user's eye separation E, and the distance Z of the viewer from the display.

2. A method as claimed in claim 1, wherein the distance Z' from the camera to the Zero Disparity Plane is calculated based on the values of N and F, and also on the values of the distance N' from the camera to the closest surface in the scene, and the distance F' from the camera to the furthest surface in the scene.

3. A method as claimed in claim 1, wherein the distance Z' from the camera to the Zero Disparity Plane is specified, values of the distance N' from the camera to the closest surface in the scene is specified, values of the distance F' from the camera to the furthest surface in the scene is specified, and the most suitable of N' or F' is kept fixed and a new value is calculated for the other of N' or F' based on the values of N and F.

4. A method as claimed in claim 1, wherein any one of the distance N' from the camera to the closest surface in the scene, the distance F' from the camera to the furthest surface in the scene, and the distance Z' from the camera to the Zero Disparity Plane is calculated based on the values of the other two.

5. A method as claimed in claim 1, wherein the maximum crossed and uncrossed disparities $d_N$ and $d_F$, are calculated from N, F, the separation E of the user's eyes, and the distance Z from the user to the display.

6. A method as claimed in claim 1, wherein the camera separation A used to produce the stereo image is calculated based on N and F to achieve the desired perceived depth (N+F).

7. A method as claimed in claim 6, wherein the field of view of the camera is adjusted to allow for that part of the image which will be cropped as a result of the use of parallel camera positions.

8. A method as claimed in claim 1, wherein the camera separation is fixed, and the desired focal length of the camera is calculated to achieve the desired perceived depth (N+F).

9. A method as claimed in claim 1, wherein the distance from the camera to the closest surface in the scene is a value of N' and the distance from the camera to the furthest surface in the scene is a value of F', the value of N' and F' are specified, and wherein the most suitable of N' or F' is kept fixed, and the focal length f of the camera is taken into account when measuring the values of N' and F'.

10. A method as claimed in claim 1, wherein the camera separation A is limited to the user's eye separation E multiplied by the scale factor S as herein defined.

11. A method as claimed in claim 1, wherein a stereoscopic pair of images is created using a given camera separation, the images are analysed to find the disparities between homologous points in the images, and said disparities are then used to adjust said camera separation.

12. A method as claimed in claim 11, wherein said stereoscopic pair of images is created for display on a first display, and wherein said camera separation is adjusted to make the images suitable for display on a second display.

13. A computing device adapted to carry out a method as claimed in claim 1.

14. A camera comprising a computing device as claimed in claim 13.

15. A camera system comprising a computing device as claimed in claim 13.

* * * * *